(12) United States Patent
Wang

(10) Patent No.: US 7,813,432 B2
(45) Date of Patent: Oct. 12, 2010

(54) OFFSET BUFFER FOR INTRA-PREDICTION OF DIGITAL VIDEO

(75) Inventor: Wen-Shan Wang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1114 days.

(21) Appl. No.: 11/027,973

(22) Filed: Dec. 30, 2004

(65) Prior Publication Data

US 2006/0146939 A1 Jul. 6, 2006

(51) Int. Cl.
H04N 7/12 (2006.01)

(52) U.S. Cl. ................................. 375/240.24

(58) Field of Classification Search ............ 375/240.01, 375/240.24
See application file for complete search history.

(56) References Cited

U.S. PATENT DOCUMENTS

| 6,122,315 | A  | * | 9/2000 | Barnes ................. | 375/240.12 |
| 6,753,871 | B2 | * | 6/2004 | Ju ........................ | 345/531 |
| 7,181,072 | B2 | * | 2/2007 | Wang et al. ........... | 382/239 |
| 7,359,439 | B1 | * | 4/2008 | Conover .............. | 375/240.12 |
| 2004/0061704 | A1 | * | 4/2004 | Ju et al. ................ | 345/564 |
| 2004/0146109 | A1 | * | 7/2004 | Kondo et al. .......... | 375/240.16 |
| 2008/0063075 | A1 |   | 3/2008 | Kondo et al. | |

FOREIGN PATENT DOCUMENTS

| JP | 2003-30935 A | 1/2003 |
| TW | 335466 B | 7/1998 |

OTHER PUBLICATIONS

PCT International Search Report, International Application No. PCT/US2005/046574 filed Dec. 12, 2005.

* cited by examiner

Primary Examiner—Y. Lee
Assistant Examiner—Richard Torrente
(74) Attorney, Agent, or Firm—Blakely, Sokoloff, Taylor & Zafman LLP

(57) ABSTRACT

Encoding digital video frames in intra-prediction mode by selecting reference data locations for blocks adjacent a current block identified by a writing pointer using reading pointer offsets added to the writing pointer. The reading pointer offsets include separate offsets for even and odd macro block rows of the frame that when added to the writing pointer create writing pointers to reference data for blocks located to the left, to the left and above, and above the current block. The offsets are pre-calculated and preloaded in an offset buffer, considering the number of macro blocks in a row of the frame, the number of blocks in a macro block, the number of reference data samples of a block, and the number of adjacent blocks reference data to be read. The concept can be applied to various video processing luminance components, chrominance components, and processing standards.

30 Claims, 8 Drawing Sheets

|   | 0 | 1 | 2 | 3 | 4 | 5 | 6 | 7 | ← COL |
|---|---|---|---|---|---|---|---|---|---|
| 0 | C0 R0 | C1 R0 | C2 R0 | C3 R0 | C4 R0 | C5 R0 | C6 R0 | C7 R0 | |
| 1 | C0 R1 | C1 R1 | | | | | | | |
| 2 | C0 R2 | | | | C4 R2 | | | | |
| 3 | C0 R3 | | | | | | | | |
| 4 | C0 R4 | | | | | | | | |
| 5 | C0 R5 | | | | | | | | |
| 6 | C0 R6 | | C2 R6 | | | | | | |
| 7 | C0 R7 | | | | | | | C7 R7 | |

↑ ROW

EVEN ROW POINTERS - 712

| MB0,8 | | MB1,9 | | MB2,10 | | MB3,11 | |
|---|---|---|---|---|---|---|---|
| 240 288 -48 | Y0 | 288 304 0 | Y1 | 304 352 16 | Y0 | 352 368 64 | Y1 |
| -48 0 -16 | Y2 | 0 16 32 | Y3 | 16 64 48 | Y2 | 64 80 96 | Y3 |
| 368 416 80 | Y0 | 416 432 128 | Y1 | 432 480 144 | Y0 | 480 496 192 | Y1 |
| 80 128 112 | Y2 | 128 144 160 | Y3 | 144 192 176 | Y2 | 192 208 224 | Y3 |

| MB4,12 | | MB5,13 | | MB6,14 | | MB7,15 | |
|---|---|---|---|---|---|---|---|
| -16 32 208 | Y0 | 32 48 256 | Y1 | 48 96 272 | Y0 | 96 112 320 | Y1 |
| 208 256 240 | Y2 | 256 272 288 | Y3 | 272 320 304 | Y2 | 320 336 352 | Y3 |
| 112 160 336 | Y0 | 160 176 384 | Y1 | 176 224 400 | Y0 | 224 240 448 | Y1 |
| 336 384 368 | Y2 | 384 400 416 | Y3 | 400 448 432 | Y2 | 448 464 480 | Y3 |

ODD ROW POINTERS - 714

US 7,813,432 B2

OFFSET BUFFER FOR INTRA-PREDICTION OF DIGITAL VIDEO

BACKGROUND

1. Field

The field generally relates to digital video encoding.

2. Background

Compressed or coded digital video is quickly becoming ubiquitous for video storage and communication. Generally speaking, video sequences contain a significant amount of statistical and subjective redundancy within and between frames. Thus, video compression and source coding provides the bit-rate reduction for storage and transmission of digital video data by exploiting both statistical and subjective redundancies, and to encode a "reduced set" of information using entropy coding techniques. This usually results in a compression of the coded video data compared to the original source data. The performance of video compression techniques depends on the amount of redundancy contained in the image data as well as on the actual compression techniques used for coding. For example, video compression or coding algorithms are being used to compress digital video for a wide variety of applications, including video delivery over the Internet, digital television (TV) broadcasting, satellite digital television, digital video disks (DVD), DVD players, set top boxes, TV enabled personal computers (PC), as well as video storage and editing.

Current compression algorithms can reduce raw video data rates by factors of 15 to 80 times without considerable loss in reconstructed video quality. The basic statistical property upon which some compression techniques rely is inter-pel correlation. Since video sequences usually contain statistical redundancies in both temporal and spatial directions, it is assumed that the magnitude of a particular image pel can be predicted from nearby pixels within the same frame (using intra-frame coding techniques) or from pixels of a nearby frame (using inter-frame techniques). In some circumstances, such as during scene changes of a video sequence, the temporal correlation between pixels and nearby frames is small (e.g., the video scene is then an assembly over time of uncorrelated still images). In such cases, intra-frame coding techniques are appropriate to explore spatial correlation to achieve sufficient data compression.

Various compression algorithms employ discrete cosine transform (DCT) coding techniques on image blocks of 8×8 pixels to effectively explore spatial correlations between nearby pixels within the same image. For example, these processes typically include reading previously saved reference data to determine a prediction direction (e.g., direction intra-prediction) and to perform predicting (e.g., intra-prediction predicting code). Additionally, after finishing an intra-prediction, these processes typically include saving part of a reconstructed "current" block to a data buffer as reference data for later prediction use (e.g., such as saving a first row and first column or last row and last column or a reconstructed block).

BRIEF DESCRIPTION OF THE DRAWINGS

Various features, aspects and advantages will become more thoroughly apparent from the following detailed description, the set of claims, and accompanying drawings in which:

FIG. 4 shows reference data of a block of data to store to a buffer.

FIG. 6 shows two rows of reference data locations for Y components.

FIG. 7 shows read pointers for two rows of reference data locations for Y components.

DETAILED DESCRIPTION

Figure 1:
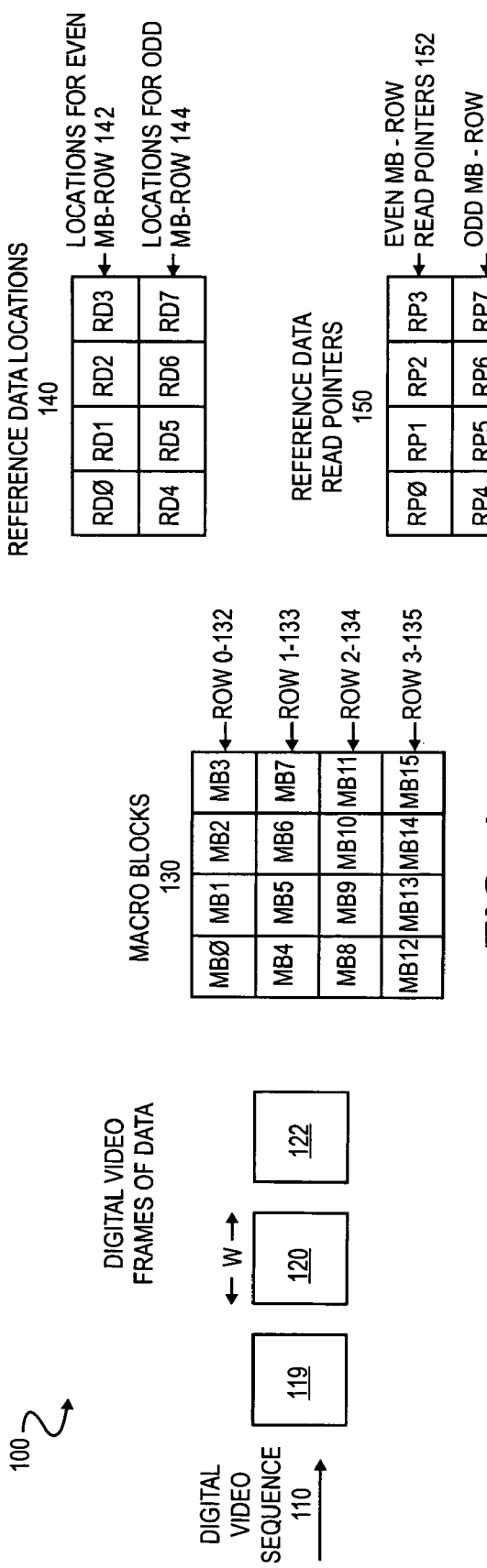
FIG. 1 is a block diagram of a system and data for encoding digital video.

FIG. 1 is a block diagram of a system and data for encoding digital video. FIG. 1 shows system 100 such as an electronic system, a computing device, a computing system, a video system, a video encoder, a video compressor, a video converter to encode or compress a digital video sequence or stream of data according to a standard. For instance, system 100 may process or encode video according to a moving picture experts group (MPEG) standard (e.g., such as MPEG2 (ISO/IEC 13818-2:2000, published 2000) or MPEG4 (ISO/IEC 14496-3:2000, published 2004)). System 100 is shown receiving digital video sequence 110 such as a sequence of stream of pictures or frames of video data, such as raster scanned frames in temporal sequential order. Specifically, digital video frames of data 119, 120 and 122 represent consecutive frames or pictures of data.

System 100 may perform direction decision and intra prediction processes of the encoding and/or decoding frame of data 120, such as by encoding intra-prediction blocks of the frame to refresh the temporal prediction of sequence 110 in an encoded (e.g., MPEG) version of the sequence. Thus, frame of data 120 may be encoded in intra-prediction mode independently of frames of data 119 and 122.

FIG. 1 also shows macro blocks 130 of a frame of digital data, such as including all or a portion of the macro blocks of frame of data 120 (e.g., intra-prediction blocks of the frame). Thus, macro blocks 130 may include macro blocks extending across all or a portion of width W of frame of data 120. Macro blocks 130 has four rows, row 0-132, row 1-133, row 2-134, and row 3-135. Thus, each or any of row 0-132 through row 3-135 may include samples extending width W. Specifically, macro blocks 130 include sixteen macro blocks (e.g., macro block MB0, MB1, ... MB15) having samples of data or image information, such as pixels, levels, information, or data for color and/or luminance of frame of data 120. In some cases, samples may represent filtered, selected, sampled, or otherwise generated information from a data entity or a pixel of the frame including samples of color (e.g., blue chrominance samples (Cb) and/or red chrominance samples (Cr)) and/or brightness samples (e.g., luminance samples (Y)). More particularly, the combination of color samples and luminance samples for a given location, dated entity, or pixel stored in a location of a macro block may represent separately stored or buffered color and luminance samples that when combined represent the pixel of the image or frame of data.

Intra-prediction encoding macro blocks 130 may be performed by comparing samples of a current block (e.g., the block being encoded) with samples of a "reference block" selected from a number of blocks adjacent to the current block. Moreover, the reference block may be selected from a number of adjacent blocks to the current block so that the difference between sample of the current block and the reference block is minimal. Therefore, the minimal difference can be coded into less data to reconstruct the current block from the reference block. During such coding, the "direction" of the reference block can be identified (e.g., direction decision) to encode the current block. Thus, direction decision can give the direction of the reference block for performing intra-predicting encoding and decoding. Reference data of the current and reference blocks stored and considered during coding may include some or all of the color and/or luminance samples of each macro block.

For example, FIG. 1 shows reference data locations 140 including rows of reference data that may be used to encode and decode a current block of samples. Locations 140 include locations for the reference data of even macro block row 142 and locations for the reference data of odd macro block row 144, such as locations for reference data of consecutive rows of macro blocks 130. Row 142 includes reference data locations RD0, RD1, RD2, and RD3. Row 142 may correspond to row 0-132 of blocks 130 (e.g., MB0-MB3). Similarly, row 144 includes RD4, RD5, RD6, and RD7, which may correspond to row 1-133 of blocks 130 (e.g., MB4-MB7).

It may be considered that rows 0-132, 1-133, 2-134, and 3-135 are "macro block (MB) rows" such as rows of macro blocks of macro blocks 130, where each MB row includes 2 rows of 8×8 Y blocks (e.g., one row includes Y0 and Y1 blocks while second row includes Y2 and Y3 blocks), one row of 8×8 Cr blocks, and one row of 8×8 Cr blocks. Thus, locations 140 (e.g., including even macro block row 142 and odd macro block row 144) may be locations for the reference data of 4 rows of 8×8 Y blocks, two rows of 8×8 Cb blocks, and two rows of 8×8 Cr blocks.

However, row 142 and row 144 may correspond to locations for any consecutive even and odd MB row of blocks 130 where locations 140 are being overwritten (e.g., according to or at a write pointer, such as write pointer 172 described below for FIG. 2) when the reference data at their locations is no longer needed during encoding processing. Specifically, row 142 may correspond to row 2-134 of blocks 130 and row 144 may correspond to row 3-135 of blocks 130 after row 142 has been rewritten with row 2-134 during processing (e.g., and prior to row 144 being rewritten with row 3-135). Thus, each location of reference data locations 140 may correspond to, point to, identify, address, store or buffer or be a location in a buffer (e.g., see buffers 149 of FIG. 2) at which data, such as reference data (e.g., as described below with respect to FIG. 4) is stored.

Reference data location read pointers may be used to point to locations 140 during direction decision and prediction. For example, FIG. 1 shows reference data read pointers 150 corresponding to or to point to reference data locations 140. Pointers 150 may point, select, identify, or direct to locations, addresses, memory, buffers, or other location identifiers for data storage, repositories or memories such as reference data locations 140 (or buffers 149 of FIG. 2). Pointers 150 include even macro block row read pointers 152 including read pointers RP0, RP1, RP2, and RP3. Pointers 152 may be used when the write pointer 172 of FIG. 2 points to row 142, such as where read pointer RP0 includes two or more read pointers to locations in locations 140, when a write pointer points to location RD0 or when location RD0 corresponds to the current block being encoded (e.g., such as when during encoding a write pointer points to block MB0 of blocks 130 to code intra-prediction direction and code for MB0). Similarly, pointers 150 includes odd macro block row read pointers 154 having read pointers RP4, RP5, RP6, and RP7. Pointers 154 may be used when the write pointers 172 of FIG. 2 points to row 144, as described above with respect to pointers 152 and row 142. Pointers 154 may function similarly to pointers 152 as described above, except that pointers 154 function for odd macro block rows, such as by pointing to locations of row 144. Note, the pointers 152 and 154 may point to the reference data in both row 142 and row 144 when the write pointer 172 points either row 142 or 144. For instance, similar to the description above regarding "macro block (MB) rows" for locations 140, pointers 150 (e.g., including even macro block row read pointers 152 and odd macro block row read pointers 154) may be pointers to the reference data of 4 rows of 8×8 Y blocks, two rows of 8×8 Cb blocks, and two rows of 8×8 Cr blocks.

Figure 2:
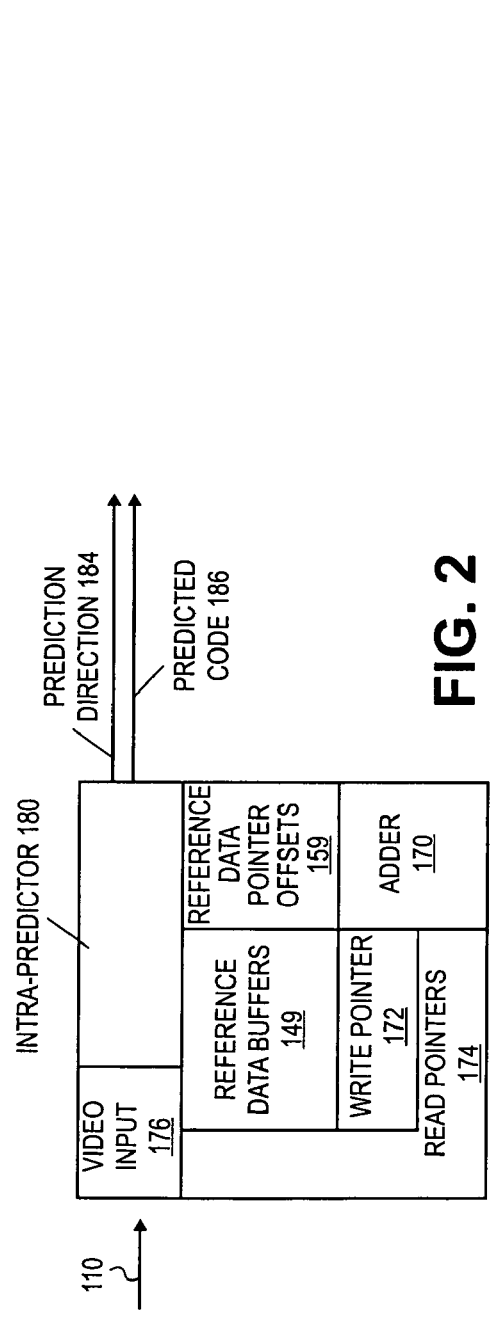
FIG. 2 is a block diagram of an intra-predictor for digital video data.

FIG. 2 is a block diagram of an intra-predictor, which is equipped in the video encoder and decoder, for digital video data. FIG. 2 shows intra-predictor 180, such as an intra-predictor that is all or part of system 100 of FIG. 1. Thus, intra-predictor 180 may process sequence 110 to produce prediction direction 184 and the predicted code 186. FIG. 2 shows intra-predictor 180 including video input 176, such as an input for receiving sequence 110 and frames of digital video therein. Video input 176 may be an electronic hardware input or source of video data such as a cable input, a television tuner output, a cable tuner output, a digital video disc player, a compact disc player, or a computer. Processes for producing predicted code 186 and direction 184 are known in the art. For instance, such processes may include a video encoder and a video decoder both having intra prediction processes but using opposite algorithms to create the predicted code 186, even though they are using the same standard (e.g., such as an MPEG standard).

To produce prediction direction 184 and predicted code 186, intra-predictor 180 may select a direction of an adjacent location to a current block of blocks 130 to compare reference data stored in locations 140 with the reference data of the current block using pointers 150. For example, FIG. 2 shows intra-predictor 180 having reference data buffers 149, such as data buffers, computer buffers or computer memory for storing reference data or samples addressed by, at, or corresponding to locations 140.

Intra-predictor 180 also includes write pointer 172 such as a pointer to point to or select a current location or block from the referenced data locations or macro blocks. For example, write pointer 172 may select one of blocks 130 or locations 140, as a "current block" for which prediction direction 184 and predicted code 186 are to be determined. In some cases, write pointer 172 will move through macro blocks of blocks 130 and/or locations of locations 140 in "raster order". Raster order may be defined as an order sequencing from left to right along a row and then moving down on column, in an increasing column sequence, to progress through the next row from left to right. For example, raster order may progress through blocks 130 in the order of MB0, MB1, MB2, MB3, MB4, MB5, MB6, MB7, MB8 . . . MB15.

Intra-predictor 180 includes read pointers 174, such as pointers to select, direct, point to, address, or identify data locations adjacent to, neighboring, or abutting the current location pointed to by the write pointer to read data from, such as to select and produce prediction direction 184 and predicted code 186. Read pointers 174 may point to one or more macro blocks of blocks 130 and/or locations of locations 140 adjacent a current block or write pointer location.

In particular, intra-predictor 180 is shown including reference data pointer offsets 159, such as offsets for determining pointers 150 corresponding to locations 140. Offsets 159 may represent offset buffers, such as data buffers, computer buffers or computer memory for various offsets to create or select read pointers based or depending or write pointer 172. For example, according to embodiments, read pointers 174 may be determined by adding offsets of offsets 159 to write pointer 172 to create, define, select, or point one or more reading pointers to point to data in buffers 149 corresponding to locations 140.

Specifically, offsets 159 may include a set of even MB row offsets and a set of odd MB row offsets that when added to write pointer 172 (e.g., a location or address of a current macro block of blocks 130 of FIG. 1 being intra-prediction encoded) by adder 170 points read pointers 174 to appropriate reference data locations 140 such as to point to locations 140 without intra-predictor 180 storing reference data read pointers 150. Thus, to provide appropriate (e.g., such as identified by pointers 150) for locations 140 of blocks 130, it may not be necessary to store in memory an entire set or table of pointers for each macro block of blocks 130 or even for an even and odd macro block row of blocks 130. Instead, an even MB row reference data pointer offset and an odd MB row reference data pointer offset can be predetermined and stored or contained in a memory, data buffer or "offset buffer" as offsets 159. Offsets 159 may contain appropriate offsets that when added with write pointer 172 (or, a location of a current macro block of blocks 130 or a reference block location of locations 140 of FIG. 1) point to the appropriate adjacent, neighbor, or abutting reference locations to the current location to select, direct, point to, identify, or find reference data at locations 140. Thus, the addition of pointer 172 and offsets 159 may point to locations of reference data stored at or in buffers 149 to be processed by intra-predictor 180 to select and/or create prediction direction 184 and predicted code 186.

For example, adder 170 may add, produce the aggregate, produce the sum, or combine an address, location, or indicator of write pointer 172 and one or more offsets of offset 159 to create or point read pointers 174 to identify, select, or point to addresses, locations, or indicators of reference data locations (e.g., described for locations 140 of FIG. 1) and/or buffers (e.g., buffers 149).

In some cases the function of adder 170 may be replaced with a function other than adding. For instance, combining offsets 159 and write pointer 172 may include adding, subtracting, multiplying, dividing, appending, or performing other arithmetic, logic, algebra, calculus, geometry, mathematical operations, mathematical functions, mathematical calculations, or mathematical combinations to combine the value, address, location, or information provided by a write pointer or the location of a current block being processed and an offset value, number, expression, or information. In some cases, the offsets and the write pointer or current location are combined (e.g., using mathematical arithmetic, logic, algebra, calculus, operations, and/or functions). Thus, offsets 159 may include information to be mathematically combined (e.g., such as by addition, subtraction, multiplication, and/or division) with pointer 172 (e.g., such as the location or address of a current block, such as one of locations 140) to determine pointers 174 at addresses or locations adjacent to or abutting pointer 172 (e.g., read pointers for addresses or locations adjacent to or abutting the current block such as one or more of locations 140 adjacent to the current location pointed to by pointer 172). Similarly, offsets 159 may be arithmetically combined (e.g., such as by addition or subtraction) with pointer 172. Also, in some embodiments, adder 170 does not index or look up pointer locations in a table or other reference containing pre-identified, selected, or addressed reference data locations such as by indexing a table of predetermined addresses.

Although, the MB rows and "macro blocks" described herein (e.g., as know in the art, such as including a structure of Y, Cr and Cb components) are example of blocks for which the concepts described herein apply. For instance, in some embodiments, rows 0-132, 1-133, 2-134, and 3-135; rows of locations 140 (e.g., including even macro block row 142 and odd macro block row 144); rows of pointers 150 (e.g., including even macro block row read pointers 152 and odd macro block row read pointers 154); and other macro block (MB) rows or other rows mentioned here may be defined by rows of samples, pixels, and/or data other than rows of "macro blocks" as know in the art (e.g., other than including rows of Y, Cr and Cb as noted herein). Also, each rows may represent more or less than one, two, three, four, five, six, seven, eight, nine, or ten rows of blocks of more or less than 4×4, 4×8, 8×4, 8×8, 8×16, 16×8, 16×16, 16×32, 32×16, 32×32, etc. . . . samples, pixels, and/or data of a video frame. Moreover, "blocks" as described herein may correspond to various geometries (e.g., square, rectangular, triangular, hexagonal, etc. . . . ) and sizes of portions (e.g., whole, half, quarter, 1/8, 1/6, 1/32, 1/64, 1/128, 1/256, etc. . . . of the width or height) of a video frame. In addition the samples, pixels, and/or data may be for one or more types of luminance, color, chrominance or other types or values of video data or image information (e.g., such as including or other than Y, Cb, and Cr).

System 100 and/or intra-predictor 180 may include a processor, a memory to store an application (e.g., such as a software, source code, or compiled code application) to be executed by the processor to cause system 100 and/or intra-predictor 180 to perform the functions described herein. Moreover, system 100 and/or intra-predictor 180 may be controlled by a computer or a machine, such as according to a machine accessible medium containing instructions (e.g., software, source code, or compiled code) that when executed by the computer or machine cause the computer or machine to control system 100 and/or intra-predictor 180 to perform functions described herein. In addition, system 100 and/or intra-predictor 180 may include various other logic circuitry, dates, computer logic hardware, memories (e.g., such as read only memory (ROM), flash memory, random access memory (RAM), or other types of electronic and/or magnetic memory), comparators, data buffers, and/or registers to perform functions described herein.

Thus, system 100 and/or intra-predictor 180 may process, encode, or compress video according to various standards, such as an MPEG standard, by reading, comparing, and/or processing samples of a current block or a current reference block of data with samples of an adjacent reference block of data. Specifically, system 100 and/or intra-predictor 180 may use macro blocks as known in the art to perform direction intra-prediction as known in the art to create prediction direction 184 and predicted code 186 as known in the art.

Figure 3:
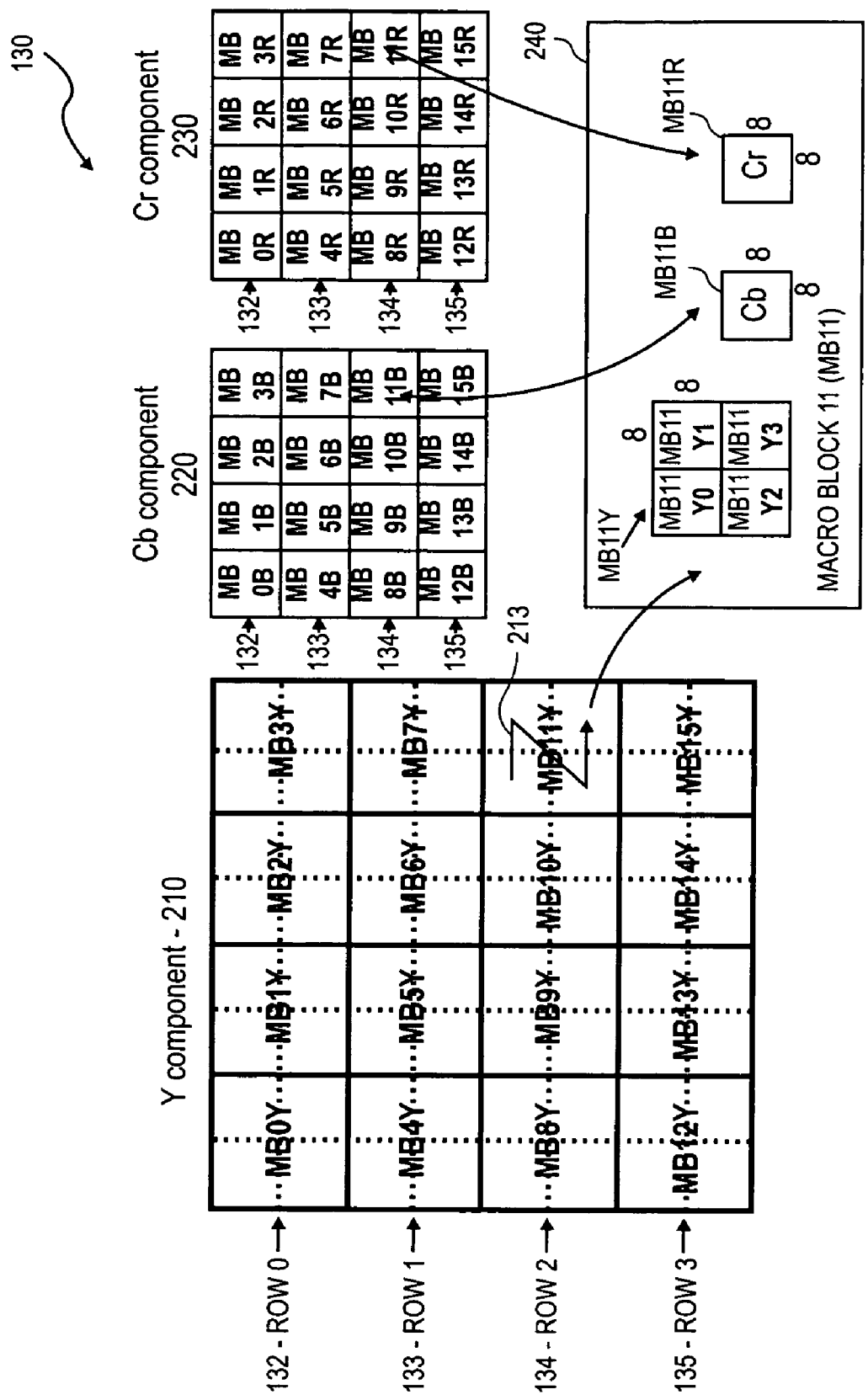
FIG. 3 shows macro blocks of digital video data.

For instance, FIG. 3 shows macro blocks of digital video data. FIG. 3 shows macro blocks 130 including Y component 210, Cb component 220, and Cr component 230. Y component 210 includes blocks of luminance samples, MB0Y, MB1Y, MB2Y . . . MB15Y. Similarly, Cb component 220 includes blocks of blue chrominance samples, MB0B, MB1B, MB2B . . . MB15B. Likewise, Cr component 230 includes blocks of red chrominance samples, MB0R, MB1R, MB2R . . . MB15R. Y component 210 may correspond to brightness or luminance samples or components as described above for FIG. 1 with respect to blocks 130. Also, Cb component 220 may correspond to color components or samples, such as blue chrominance samples as described above at FIG. 1 for blocks 130. Similarly, Cr component 230 may correspond to samples or components of color, such as red chrominance samples as described above at FIG. 1 for blocks 130. Block 130 may be macro blocks of video with a 4:2:0 format where each macro block is organized by a 16×16 block of luminance samples (Y), an 8×8 block of blue chromatic samples (Cb), and an 8×8 block of red chromatic samples (Cr). Each 16×16 block of Y samples may be further divided into four 8×8 blocks of luminance samples Y0, Y1, Y2, and Y3) as shown by the dotted lines in component 210. In other words, blocks 130 may represent a video frame containing 64×64 pixels where each pixel is represented by Y, Cb, and Cr components with a 4:2:0 sub-sampling format, in 16 macro blocks, where each macro block contains four Y blocks, one Cb block, and one Cr block. For example, the four Y blocks may define four 8×8 blocks oriented in a square pattern with 8×8 Y0 block in upper left, 8×8 Y1 block in upper right, 8×8 Y2 block in lower left, 8×8 Y3 block in lower right (e.g., see FIGS. 3 and 5). In addition, a 16×16 block of Y samples including four 8×8 Y0, Y1, Y2, and Y3 blocks may be defined as a "16×16 block" or a "16×16 Y block". Alternatively, blocks 130 may be a 64×64 video area portion of a video frame, such as a portion not including the entire frame. Hence, macro blocks MB0 through MB15 having component 210, 220, and 230 each correspond to a 16×16 pixel region of a frame (e.g., where each macro block MB0 through MB15 is a basic unit for video coding standards such as an MPEG standard).

Each of the blocks of luminance samples of Y component 210 (e.g., block of luminance samples MB11Y) includes four 8×8 blocks of luminance samples, such as shown by the dotted lines in Y component 210. For example, window 240 shows Y, Cr and Cb components of macro block MB11 (e.g., window 240 shows the samples of luminance and color for macro block MB11 of blocks 130 of FIG. 1). As shown, MB11 has 16×16 block of luminance samples MB11Y, 8×8 block of blue chrominance samples MB11B, and 8×8 block of red chrominance samples MB11R. In addition, samples of 16×16 block MB11Y are subdivided into four 8×8 blocks MB11Y0, MB11Y1, MB11Y2, and MB11Y3. Each block MB11Y0 through MB11Y3 is an 8×8 block of luminance samples, 16×16 block of luminance samples MB11Y. On the other hand, samples MB11B and samples MB11R are 8×8 blocks of samples only. Thus, there are four times as many luminance samples for each macro block as there are blue chrominance or red chrominance samples (e.g., hence, the 4:2:0 sub-sampling format distinction).

Video coding processes described above for system 100 of FIG. 1 and/or intra-predictor 180 of FIG. 2 may process video in raster order, from left to right and from top to bottom, such as is described above with respect to intra-predictor 180 of FIG. 2. Thus, a read pointer can process or select a current block of rows 0-132 through row 3-135 of component 210, 220, and 230 in raster format, by processing or pointing to the locations of each block while moving through each row from left to right starting with row 0 and ending with row 3. Moreover, 8×8 blocks of component 210 are processed in similar raster order. Thus, 8×8 blocks of samples MB11Y will be processed in the order MB11Y0, MB11Y1, MB11Y2 and then MB11Y3. For instance, arrow 213 of component 210 shows the order of the processing of 8×8 blocks of samples for 16×16 block MB11Y.

In addition, video processing standards described above for system 100 of FIG. 1 or intra-predictor 180 of FIG. 2, may store all or some of the samples of each block of luminance or color samples of a macro block as data to be used during processing, such as referenced data. For example, FIG. 4 shows reference data of a block of data to store to a buffer. FIG. 4 shows block 400 including columns COL0 through COL7 and rows ROW0 through ROW7. Block 400 may represent any of the 8×8 blocks of luminance samples (e.g., any of MB11Y0 through MB11Y3), an 8×8 block of CB samples (e.g., MB11B), or a 8×8 block of CR samples (e.g., MB11R).

Specifically, as shown in FIG. 4, block 400 includes column 0 row 0 sample C0 R0, column 1 row 0 sample C1 R0, column 2 row 0 sample C2 R0 . . . through column 7 row 7 sample C7 R7. Thus, any of these samples such as column 4 row 2 sample C4 R2 may correspond to one of the samples of an 8×8 block of luminance or of a 8×8 block of blue or red chrominance samples.

Thus, locations of reference data locations 140 (e.g., location RD0) may store or correspond to a buffer (e.g., a buffer of buffers 149) that stores the samples of row 0 and of column 0 of block 400 (e.g., that stores ROW0 of samples and COL0 of samples). For example, only the first column of 8 samples in the first row of 8 samples of each of blocks MB11Y0 through MB11Y3, MB11B, and MB11R may be stored in a buffer (e.g., such as buffers 149 corresponding to locations 140 of FIG. 1) as reference data. Specifically, the location or buffer may store the samples at C0 R0, C1 R0, C2 R0, C3 R0, C4 R0, C5 R0, C6 R0, C7 R0, C0 R1, C0 R2, C0 R3, C0 R4, C0 R5, C0 R6, C0 R7, and optionally C0 R0 again for a total of 16 samples.

In addition, for video processing by system 100 or intra-predictor 180, reference data for the same components (e.g., for component 210, component 220, or component 230) may be stored together, located together, or stored at or in the same set of buffers. In other words, the first row and column of samples of each block of MB0-MB5 of blocks 130 (e.g., see first row and column of block 400) may be stored in three separate buffers, one each for Y, Cr and Cb components (e.g., where each buffer is a buffer such as buffers 149). Thus, one buffer stores reference data for luminance samples (e.g., reference data for Y component 210), one buffer stores reference data for Cb samples (e.g., such as samples for component 220), and one buffer stores reference data for Cr samples (e.g., such as samples for component 230).

Furthermore, for video processing described for system 100 or intra-predictor 180 may produce or generate prediction direction 184 and predicted code 186 of FIG. 1 using reference data from blocks adjacent, to, neighboring, or abutting in location to the current block location (e.g., such as pointed to by the write pointer). Such adjacent or abutting locations may include locations next to or abutting the current block. Also, such locations may include only one row vertically either above the row the current block is located in. If this is true, it is only necessary to store four rows or two rows of reference data samples for Y components or Cb/Cr components, respectively, during processing, the row that includes the current block and the row that is required for processing and is either vertically above or below the current block. As such, reference data locations and pointers are only necessary for two macro block (MB) rows, such as an even MB row and an odd MB row of the macro blocks of blocks 130 of FIG. 1 such as described above with respect to locations 140 and pointers 150 of FIG. 1. Note that one macro block rows has two block rows of Y components and has one block rows of Cb and Cr components.

Figure 5:
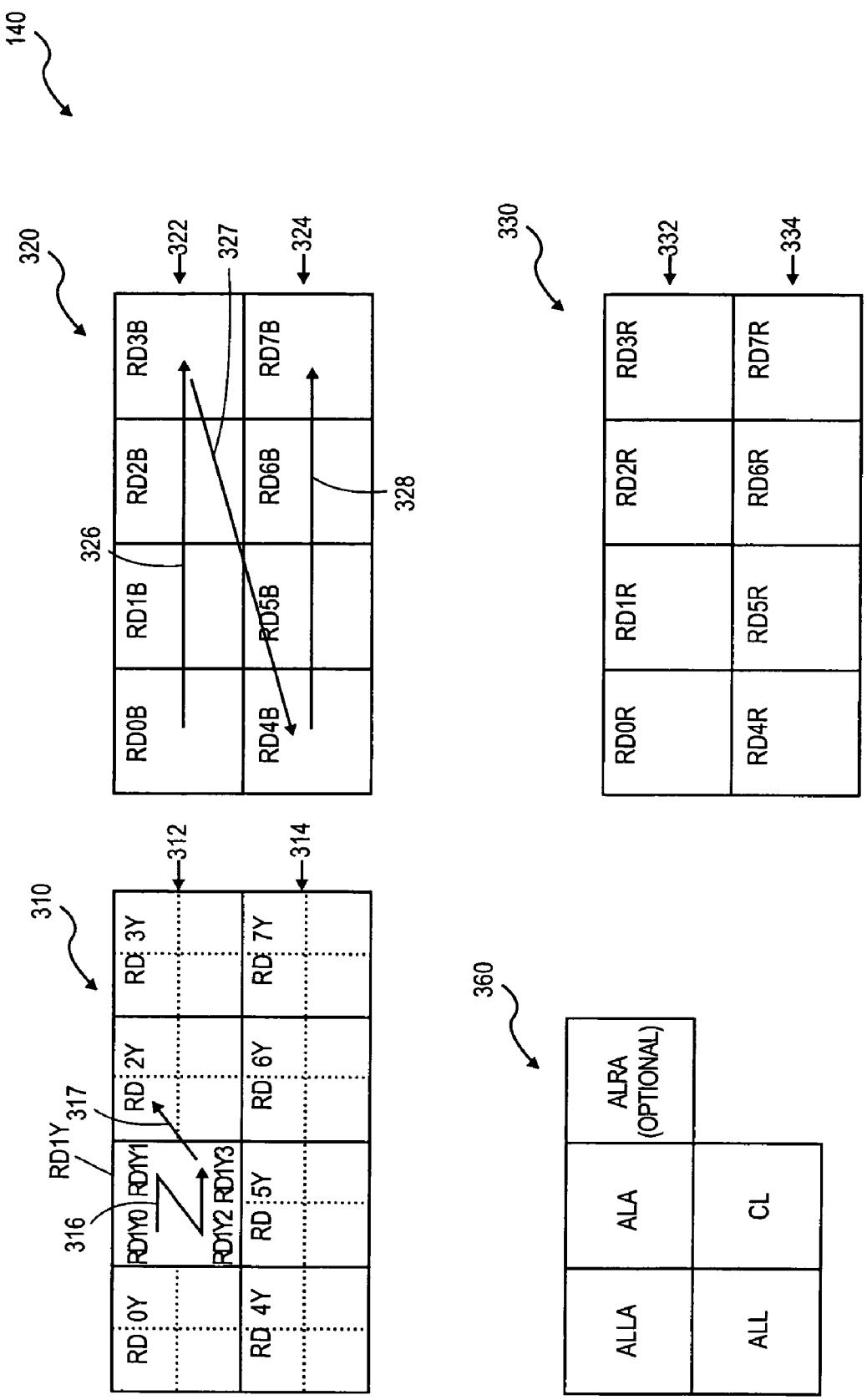
FIG. 5 shows locations of reference data locations of macro blocks.

More particularly, FIG. 5 shows locations of reference data of macro blocks. FIG. 5 shows reference data locations 140 divided into separate locations for each of the Y, Cb, and Cr components. FIG. 5 shows four rows of Y reference data locations 310, two rows of Cb reference data locations 320, and two rows of Cr reference data locations 330. Data locations 310 is shown having even row 312 including RD0Y, RD1Y, RD2Y and RD3Y; and having odd row 314 having RD4Y, RD5Y, RD6Y, and RD7Y. Likewise, data locations 320 is shown having even row 322 having RD0B, RD1B, RD2B, and RD3B; and having odd row 324 having RD4B, RD5B, RD6B, and RD7B. Similarly, data locations 330 is shown having even row 332 with RD0R, RD1R, RD2R, and RD3R; and odd row 334 having RD4R, RD5R, RD6R, and RD7R. Each reference data location of data locations 310 (e.g., RD0Y), data locations 320 (e.g., RD0B), or of data locations 330 (e.g., RD0R) may thus correspond to the location of samples of reference data for the separate components (e.g., Y, Cb, and Cr).

For instance, locations RD0Y, RD0B, and RD0R may correspond to location RD0 of locations 140 of FIG. 1 and/or may correspond to the location of buffers where the samples are stored (e.g., such as buffers 149 of FIG. 1). In other words, each location of locations 140 (e.g., RD0) may define a locations of reference data in each of locations 310, 320, or 330 (e.g., RD0Y, RD0B, and RD0R).

Thus, each location of locations 310 may store or correspond to 64 samples of referenced data. Hence, RD1Y may be a location of 64 samples of reference data of a macro block having locations for four 8×8 blocks of 16 samples each (e.g., 16 samples of a first column of 8 and a first row of 8 samples), where RD1Y0 is a location of 16 samples (e.g., a first column of 8 samples and a first row of 8 samples), RD1Y1 is a location of 16 samples, RD1Y2 is a location of 16 samples, and RD1Y3 is a location of 16 samples. Alternatively, locations of reference data locations 320 and 330 (e.g., RD0B or RD0R) may be locations of only 16 samples per macro block, such as 1 row of 8 samples and 1 column of 8 samples of reference data for RD0B.

Processing, write pointing, or selecting a current block may include moving through macro block, 16×16 block, or 8×8 block locations of or corresponding to locations 310, 320, or 330 in raster order to determine prediction direction 184 and predicted code 186 as described with respect to FIGS. 1 and 3. In other words, at a first level, for locations of locations 310, 320, or 330 the writing pointer or current block may be selected along a path of macro blocks (e.g., 16×16 blocks for Y; or 8×8 blocks for Cb and Cr) that corresponds to moving along an even MB row of locations as shown by line 326, then transition to the next odd MB row as shown by line 327, and continues along that subsequent odd MB row as shown by line 328.

In addition, since data locations 310 include four 8×8 Y blocks in a macro block (e.g., 16×16 Y block RD1Y includes four 8×8 blocks RD1Y0, RD1Y1, RD1Y2, and RD1Y3), processing may consider reference locations of the four 8×8 Y blocks in a macro block (e.g., RD1Y0-3 of RD1Y) in raster order. Specifically, for 16×16 Y block RD1Y, processing may consider the 8×8 blocks in the order RD1Y0, RD1Y1, RD1Y2, and then RD1Y3). For example, while moving along row 312 of data locations 310, processing (such as considering reference data of locations 310 related to a writing pointer or current block) must move along line 316 of block RD1Y. Then, after processing block RD1Y, processing may continue along line 317 to process block RD2Y. After processing for locations along line 328, even row 322 may be overwritten with reference data (e.g., according to or at a write pointer, such as write pointer 172 of FIG. 2) for the next or subsequent even MB row of macro blocks of the frame (e.g., such as of blocks 130) and processing may reoccur for locations along line 326 for that subsequent even MB row of locations.

Furthermore, processing may include considering or reading reference data from adjacent or abutting locations, addresses, or buffers to a current location (e.g., such as a location pointed to by write pointer 172 of FIG. 2), such as locations to the left of, to the left and above, above, and optionally to the right and above the current location when determining prediction direction 184 and predicted code 186 as described above for FIG. 1. For example, template 360 of FIG. 5 shows current location CL (such as a location of a macro block of blocks 130, locations 140, data locations 310, data locations 320, or data locations 330 being processed, considered, or pointed to by a write pointer). Template 360 also has adjacent or abutting left location ALL, left and above location ALLA, above location ALA, and optional right above location ALRA. Thus, when the write pointer or current block being processed is at current location CL of template 360, locations ALL, ALLA, and ALA provide three locations for reference data adjacent to CL.

Moreover, template 360 may be applied at the block level. For example, locations CL, ALL, ALLA, ALA, and ALRA may each correspond to the location of reference data for an 8×8 Cb or Cr block (e.g., such as RD0B or RD0R) or for an 8×8 Y block (e.g., such as RD1Y0, RD1Y1, . . . ). Thus, for a write pointer or current block corresponding to a block location of locations 310, 320, or 330, adjacent locations may be considered in accordance with applying template 360 at the 8×8 block level. Note that since template 360 only includes two rows of adjacent or abutting locations, only 2 rows of reference data and reference data locations need to be saved in buffers, such as at data locations 310, 320, or 330.

Where processing of a current block only requires considering reference data from two rows of adjacent or abutting blocks, the "far away", non-adjacent, or non-abutting blocks are "no more used" and can be overwritten row by row (e.g., according to or at a write pointer, such as write pointer 172 described below for FIG. 2). Thus, as processing (e.g., write pointer) continues to subsequent rows, the unused, even, or odd MB row of data locations 310, 320, or 330 may be overwritten with subsequent reference data so that an entire frame can be processed with only four rows of Y reference data and two rows of Cr and Cb reference data and locations. Specifically, it is possible to overwrite the referenced data stored in buffers or at locations in a block by block sequence using a writing pointer, such as to overwrite locations RD0Y, RD0B, RD0R of data locations 310, 320, and 330 in a location by location fashion.

For example, Cb reference data locations corresponding to row 0-132 of blocks 130 of FIG. 1 may be stored in locations of row 322 of data locations 320 and reference data locations for row 1-133 may be stored in locations of row 324. After processing along line 328 to process macro blocks of row 1-133, locations of row 322 may be overwritten (e.g., according to or at a write pointer, such as write pointer 172 described below for FIG. 2) with reference data locations for row 2-134 so that that row can then be processed along line 326. Note that when processing by row 2-134 considering locations overwritten into locations of row 322 along line 326, the adjacent or abutting locations above the current location being processed along line 326 will still exist since the row 1-133 data is still stored in locations of row 324. After processing row 2-134, the row 1-133 data in locations of row 324 may be overwritten with row 3-135 data and processed along line 328, and so on.

Because of the structure of locations 310 (e.g., see FIG. 5) locating reference data samples adjacent to an 8×8 block of locations 310 can be a bit more complicated than locating adjacent reference data samples for a macro block of locations 320. Specifically, application of template 360 to 8×8 blocks of locations 310 will include processing in a path similar to that shown with respect to lines 326 and 328 of locations 320, but will also include processing along line 316 and line 317 for 8×8 blocks of each macro block. Thus, movement of the write pointer or current block, and determining read pointers to access reference data at locations adjacent thereto is more difficult for locations 310.

Figure 6:
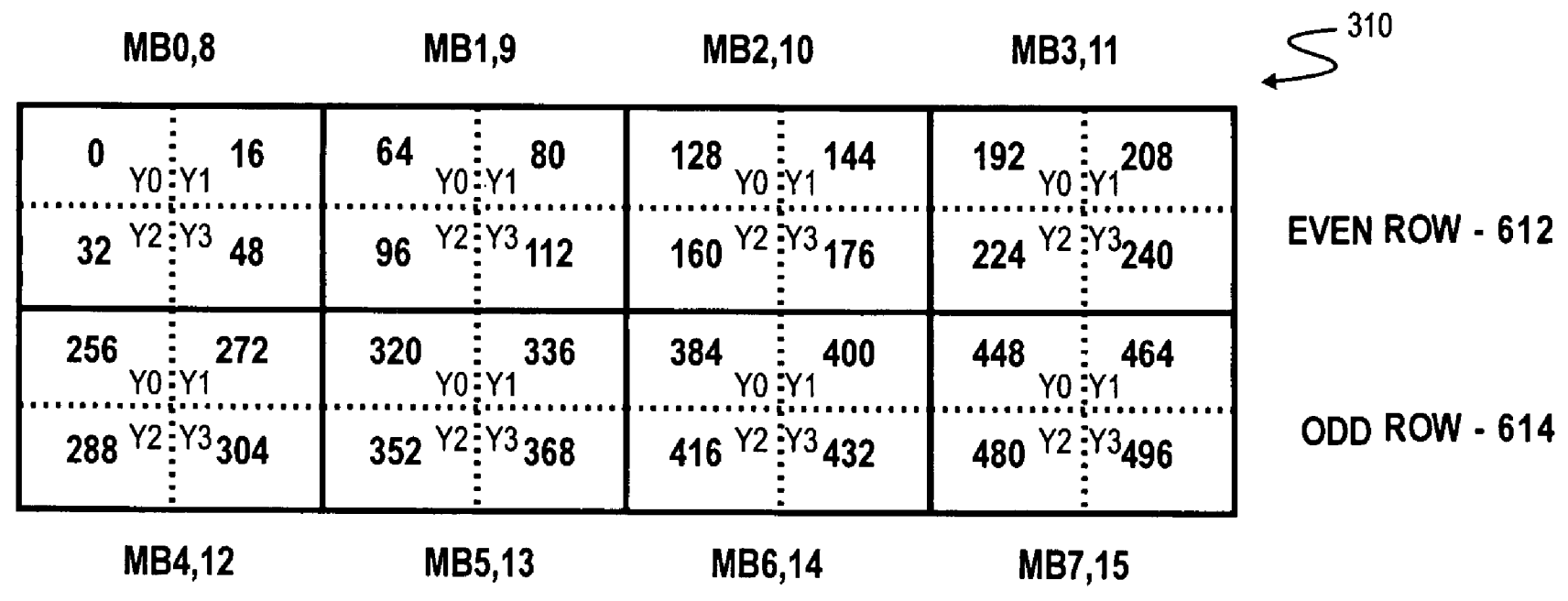

For instance, FIG. 6 shows two MB rows of Y reference data locations. FIG. 6 shows two MB rows of Y reference data locations 310, such as the luminance reference data for reference data locations 140 of blocks 130 of FIG. 1. Locations 310 are shown including even row 612 and odd row 614 corresponding to locations for storing reference data luminance samples for blocks 130 of FIG. 1. For instance, row 612 includes storage for MB0 through MB3, as well as MB8 through MB11. Similarly, row 614 includes MB4 through MB7, and MB12 through MB15. FIG. 6 also shows reference data locations for the 8×8 blocks divided by dotted lines, such as where the MB0 or MB8 includes blocks Y0, Y1, Y2, and Y3. Row 612 and 614 can store for different blocks due to over writing.

For example, the writing pointer may be generated starting from 0 and increasing by a constant number to the next block. The writing pointer may then return to 0 after it hits the last 8×8 Y3 block of the odd macro block row (e.g., such as Y3 of MB15 of row 614 at 496). As the progress of the writing pointer is predictable, reading pointers can be generated or point to locations by mathematically combining offsets with the writing pointer locations. Hence row 612 will includes storage for MB8 through MB11 when MB0 through MB3 are overwritten according to or at a write pointer, such as write pointer 172 described below for FIG. 2, because MB0 through MB3 are no longer needed during processing.

Moreover, the reference data location for block MB0 or MB8 shows the number, address, or a location number for the first data sample stored in each block (such as the number a write pointer, such as write pointer 172 described below for FIG. 2, will point to or address). Specifically, for MB0, FIG. 6 shows a 0 in the location of block Y0 corresponding to the first sample of luminance reference data being at location 0, a 16 in the Y1 block indicating that the first sample there is at location or address 16, a 32 at the Y2 block, and a 48 at the Y3 block. Similarly, the reference data location for MB1 continues in the raster sequence as described above such that the location or address for the Y0 block of MB1 begins at 64 and continues incrementing in increments of 16 as described for blocks in MB0.

The "far away", or "no more used" reference data of FIG. 6 can be overwritten row by row as follows. The reference data for block MB8 can overwrite that of block MB0 after processing of block Y0 of MB5 using template 360 because after processing block Y0 of MB5, at most processing of the rest blocks in MB5 and all blocks in MB6 and MB7 will consider left and above adjacent locations at blocks in MB1 through MB3. Similarly, after row 612 is overwritten the first time with data for blocks in MB8 through MB11 (e.g., while data for blocks in MB4 through MB7 is still stored at row 614), reference data for blocks in MB12 may overwrite that for blocks in MB4 after processing of block MB9 since at that point at most reference data for blocks in MB5 through MB7 will be required for processing blocks in MB10 and 11.

Although row 612 is above row 614 in FIG. 6, locations of row 612 where all of row 612 may be overwritten and processed while locations in row 614 include data from a row of macro blocks in the frame above those being written into row 612. For example, while row 614 retains reference data for macro blocks MB4 through MB7, row 612 may be overwritten with data for macro blocks MB8 through MB11 during processing. Thus, each small box in FIG. 6 (e.g., MBY0 8×8 block of reference data locations for MB0) represent the location of 16 reference data samples of a block such as 8 reference data samples of the first row and 8 reference data samples of the first column of a Y, Cb, or Cr component of a macro block where the number in the small box is the starting address of the reference data of the corresponding block. Moreover, the Y0, Y1, Y2, and Y3 blocks of the reference data locations correspond to the upper left, upper right, lower left and lower right blocks of a corresponding macro block.

FIG. 7 shows read pointers for two rows of reference data locations for Y components. FIG. 7 shows pointers 750 for reference data locations 310. For example, where locations 310 correspond to luminance reference data locations of locations 140 of FIG. 1, pointers 750 may correspond to pointers 150 for pointing to locations 140 as described above with respect to FIG. 1. Pointers 750 include even row pointers 712 and odd row pointers 714 including pointers to corresponding locations of FIG. 6. Thus, FIG. 7 shows pointers for an embodiment such as where template 360 includes considering adjacent locations ALL, ALLA, ALA, but not ALRA of current location CL. Specifically, pointers for block Y1 of MB5 may point to reference data from Y2 of MB1 (96), Y3 of MB1 (112), and Y0 of MB5 (320), and optionally Y2 of MB2 (160). Similarly, pointers for reference data of Y0 of MB9 may point to Y3 of MB4 (304), Y2 of MB5 (352), and Y1 of MB8 (16, as 16 now represents the location of reference data starting at the 16th sample of the overwritten reference data in row 612 which is that for MB8), and optionally Y3 of MB5 (368).

It can be appreciated that although the write pointer (such as write pointer 172 of FIG. 1) only requires one pointer that can be incremented in equal increments of address or location through reference data during processing, such as by being incremented by increments of 16 to process through locations 310 as shown in FIGS. 5 and 6, or locations 320 or 330 as shown in FIG. 5, determining the appropriate read pointers is more complicated. In other words, writing the reference data using a write pointer may be performed in sequential order of increasing addresses from the lowest address to the highest address, such as by incrementing from 0 to 496 as shown in FIG. 6. In some cases, the write pointers for the Y, Cb, and Cr reference data may be increased by a constant number (e.g., such as 16 or 8) to move through reference data for one block to the next. Thus, as shown in FIG. 6, a writing pointer may increment as follows: 0, 16, 32, 48, 64 . . . , 480, 496, 0, 16, . . . as processing continues from row 612 to row 614 and as reference data is overwritten into those rows. Similarly, the three reading pointers, as shown in FIG. 7, are not incremental increases but would be determined for the above sequence as follows: 240, 288, −48, 288, 304, 0, −48, 0, −16, 0, 16, 32, 304, 352, . . .

Figure 8:
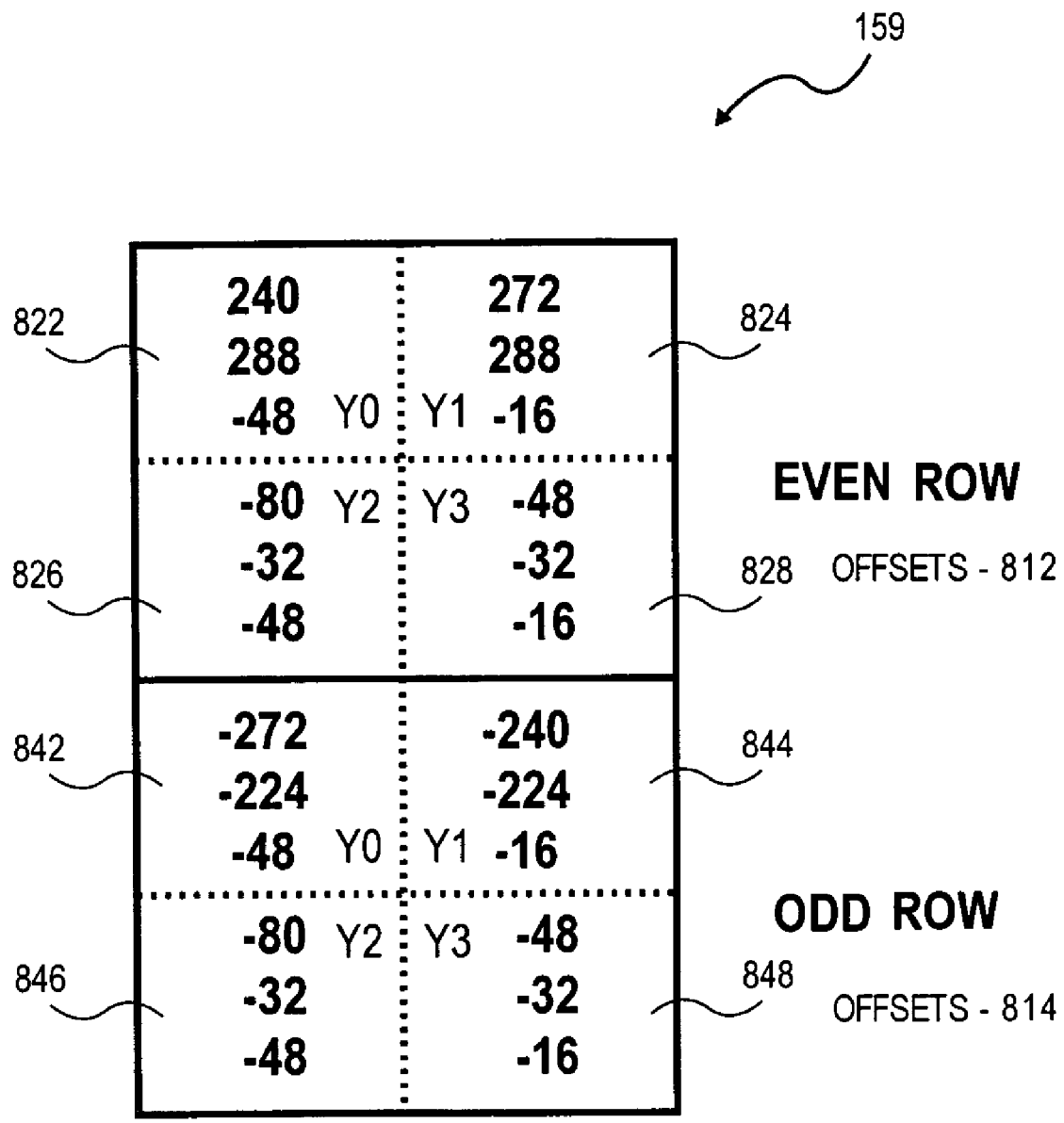
FIG. 8 shows two rows of offsets for calculating read pointers for Y components.

As noted above with respect to offsets 159 of FIG. 1, according to embodiments, a set of offsets may be determined and used to provide the even row pointers 712 and odd row pointers 714 of FIG. 7 by combining or adding those offsets with the write pointer address or location, as described above with respect to intra-predictor 180 of FIG. 2. For example, FIG. 8 shows two rows of offsets for calculating read pointers for Y components. FIG. 8 shows offsets 159 including even row offsets 812 and odd row offsets 814, such as offsets for being mathematically combined or added with a write pointer location or address to create, point, select, or determine pointers 750 shown in FIG. 7. FIG. 8 shows even row offsets 812 including offsets 822 for reference data locations for block Y0 of an even MB row of reference data locations.

For instance, offsets 822 give offsets to provide pointers for any of the Y0 blocks of pointers 712 given the current block write pointer. Thus, when the write pointer points to Y0 of MB0 and thus has a value of 0 as shown in row 612 of FIG. 6, the value of 0 is added to all of the offsets of offsets 822 and provides the pointers indicated for block Y0 of pointers 712 of FIG. 7 (e.g., 240, 288, −48). Similarly, when the write pointer points to Y0 of MB2 of row 612 of FIG. 6, 128 added to the values of offsets 822 provides pointer locations for Y0 of MB2 at pointers 712 of FIG. 7 which are 368, 416, and 80. Offsets 812 include offsets 824 for reference locations for block Y1, offsets 826 for reference data locations for block Y2, and offsets 828 for reference data location for block Y3.

Similarly, odd row offsets 814 include offsets 842 for reference data locations for blocks Y0 when the pointer, current block, or processing occurs for odd rows of macro blocks or reference data, such as row 1-133, odd row read pointers 144, odd row read pointers 154, row 614, and/or odd row pointers 714. For example, when the write pointer points to block Y0 of MB6 of row 614 of FIG. 6, the value of 384 is added to offsets 842 to provide the pointers of Y0 of MB6 shown in pointers 714 of FIGS. 7, 112, 160, and 336. Similar to offsets 812, offsets 814 includes offsets 844 for reference data locations for block Y1 of odd MB rows of reference data locations, offsets 846 for reference data locations of block Y2, and offsets 848 for reference data locations of blocks Y3.

Thus, offsets 159 may be contents stored in a memory, data buffer, or offset buffer (e.g., such as stored in offsets 159 as described for FIG. 1) that are pre-calculated and preloaded so that offsets 812 generate pointers to reference data for even macro block rows (e.g., when the write pointer or current block is in row 0-132 of blocks 130 of FIG. 1), while those in offsets 814 are used to create or generate pointers to reference data for odd macro block rows (e.g., such as where the write pointer or processing is in row 1-133 of blocks 130 of FIG. 1). Each entry of offsets 822, 824, 826, 828, 842, 844, 846, and 848 creates read pointers for reference data for the macro block located to the top left, top, and left (e.g., see template 360 of FIG. 5 of the current block being processed or predicted to produce prediction direction 184 and predicted code 186 of FIG. 1.

In addition, accessing the appropriate offsets of offsets 159 can be accomplished by storing the offsets sequentially as offsets 822, 824, 826, 828, 842, 844, 846, and then 848. Moreover, an offset buffer or memory to store offsets 159 can be reduced in size by noting that offsets for blocks Y2 and Y3 of offsets 812 are the same as those for offsets 814. Therefore, a buffer or memory storing offsets 159 can store less than the 24 offsets shown in offsets 159, such as by storing offsets 822, 824, 826, 828, 842, and 844, and using processing that indicates that when the offsets corresponding to offsets 846 and 848 are needed, offsets 826 and 828 may be used instead of accessed to provide the appropriate pointers.

The concepts described above with respect to offsets 159 of FIGS. 1 and 8 can be expanded to apply to various processes and video encoding processes (e.g., such as intra-prediction coding) where for a block being processed or predicted, previously saved reference data is to be read from a reference buffer (e.g., such as from buffers 149 according to locations 140, 310, 320, 330), and writing parts or samples of reconstructed data to the reference data buffers for later prediction use (e.g., such as writing reference data to locations as described above with respect to writing and overwriting data into locations 310, 320, and 330). In other words, the concepts with respect to offsets 159 may be applied to various processes where data is written to the buffers as it is read out of the buffers and where there is a relationship between the writing pointer and the reading pointers. Thus, the relationship can be simplified by a number of offsets with respect to the writing pointer, such that an intra-prediction may read reference data of previous blocks while writing reference data of the current block.

Figure 9:
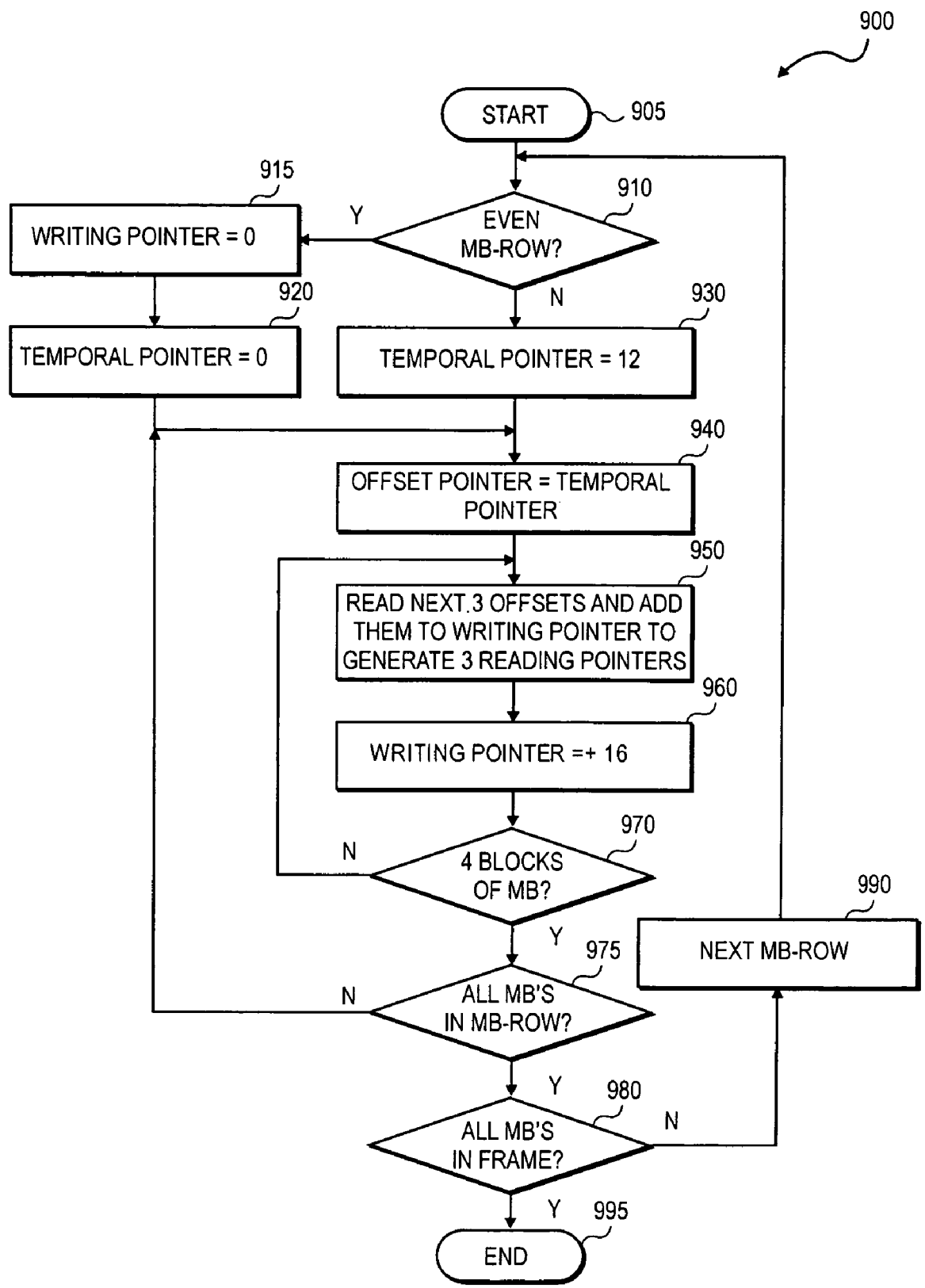
FIG. 9 is a flow diagram of a process for calculating read pointers for Y components.

For example, FIG. 9 is a flow diagram of a process for calculating read pointers for Y components. At block 905, the process begins. FIG. 9 shows process 900, such as a process for adding a current location selected from a plurality of reference data locations of a digital video frame to read pointer offsets to select or identify reference data samples for blocks adjacent or abutting to the current location. At block 910, it is determined whether the write pointer is at an even macro block row, such as row 0-132 of blocks 130 of FIG. 1; or row 312, 322, 332 of FIG. 5; or row 612 of FIG. 6. If at block 910 the write pointer is at an even MB row, the process continues to block 915 or the writing pointer is set to 0, or initialized, such as to point to reference data location for block Y0 of MB0 equal to 0 of row 612 of FIG. 6; Y0 of RD0Y of locations 310 of FIG. 5. Next, at block 920, a temporal pointer is set to 0 of the offset buffer or initialized, such as by being set to 0 of offsets 822, 824, 826, and 828 which identifies an offset value of 240 (e.g., the first offset value of offsets 812). From block 920, processing continues to block 940.

Alternatively, if at block 910 the write pointer does not point to an even macro block row, processing continues to block 930. At block 930, the temporal pointer is set to 12 of the offset buffer, such as to move the temporal pointer to the first offset of offsets 814 of offsets 159 to have a value of −272 (e.g., the temporal pointer points to the first offset of offsets 842, 844, 846, and 848). Note that for blocks 920 and 930, the temporal pointer is set to 0 or 12 as the number of offsets in offsets 812 and offsets 814 is 12 total offsets (e.g., the number of offsets for each block multiplied by the number of blocks of a macro block). It can be appreciated that for processing other samples or according to other standards, block 930 may set the pointer to a number of offsets other than 12. From block 930, processing continues to block 940. At block 940, the offset pointer is set to the temporal pointer, such as by setting a pointer within offsets 159 to the current value of the temporal pointer.

At block 950, the next three offsets are read and added to the writing pointer to generate three reading pointers. Block 950 may correspond to adding the value of offsets 822, 824, 826, 828, 842, 844, 846, or 848 to the value of the writing pointer to generate reading pointers as described above with respect to the offsets of FIGS. 1 and 8 and generating read pointers similar to those shown for FIG. 7 using offsets. The first, second, and third offsets in offsets 822 through 848 are used to create the reading pointers for the reference data for blocks located to the top left, top, and left, respectively, of the location of the writing pointer. The three offsets may create a top left, top, and left reading pointer with respect to the location of the writing pointer to point to previous reference data where three is the total number of offsets for one block or the number of abutting or adjacent reference data locations to be accessed. It can be appreciated that for processing other samples or according to other standards, block 950 may read and add more or less offsets than 3.

At block 960, the writing pointer is increased by 16, such as where 16 is the number of samples of reference data at a location or stored in a buffer corresponding to the location for a block being pointed to by the writing pointer. It can be appreciated that for processing other samples or according to other standards, block 960 may increase the writing pointer by a number other than 16 (e.g., such as where each block is a size other than 8×8, or where more or fewer than one column and one row of 8 samples of reference data are stored). At block 970, it is determined whether the four Y blocks of a macro block have been processed (e.g., according to or at a write pointer, such as write pointer 172 described below for FIG. 2). If at block 970, the four blocks have not been processed, processing returns to block 950 where the next three offsets are added to the writing pointer to determine the adjacent or abutting reference data locations for the next block addressed by the writing pointer (e.g., as incremented at block 960). It can be appreciated that for processing other samples or according to other standards, block 970 may not be considered or may determine whether a number of blocks, other than 4 have been processed.

If at block 970 the four blocks have been processed, processing continues to block 975 where it is determined whether all the macro blocks in a macro block row have been processed, such as by determining whether MB0 through MB3 of row 0-132 of blocks 130 have been processed of FIG. 1. If at block 975, all blocks have not been processed, processing returns to block 940 to process the next macro block of the row. Alternatively, if at block 975, all macro blocks have been processed in a row, processing continues to block 980.

At block 980, it is determined whether all the macro block rows in a frame of digital video data have been processed. If at block 980, all macro blocks of the frame have not been processed, processing continues to block 990 where the next macro block row is processed, such as by going from row 0-132 to row 1-133 of blocks 130 of FIG. 1. After block 990, processing returns to block 910 and the next macro block row is processed. Block 990 may include writing reference data to locations for a block or a row of reference data locations, such as described above with respect to FIGS. 5 and 6. If at block 980, all the macro block rows in a frame have been processed or exhausted, processing continues to block 995 where processing ends.

For example, using process 900 of FIG. 9; corresponding macro blocks and 8×8 blocks of FIGS. 6 and 7; and offsets of FIG. 8, top left, top, and left reading pointers may be created, located, or directed to point to reference data locations as follows. To get reading pointers for the Y0 block of MB0 or MB8 (see FIGS. 6 and 7), at blocks 905 through block 940, the offset pointer, temporal pointer, and writing pointer are set to zero (see FIG. 9). At block 950, the next three offsets, offsets 240, 288, and −48 are read from offsets 822 (see FIG. 8) of the offset buffer (such as a buffer of intra-predictor 180 storing offsets 159 as shown in FIG. 1). Also, at block 950, offsets 240, 288, and −48 are added to writing pointer zero (see the value at block Y0 of MB0 or MB8 of FIG. 6) resulting in reading pointers 240, 288, and −48 (see appropriate reading pointers for block Y0 of MB0 and MB8 of FIG. 7). Since these reading pointers are "out of border" such as be being outside of the macro block location structure shown in FIGS. 6 and 7 (e.g., they are above and to the left of the above and left most position of block Y0 of MB0) except for the 288 pointer which points to block Y2 of MB4 when the writing pointer points to block Y0 of MB8 (see FIG. 6).

Next, at block 960, the writing pointer is incremented, at block 970 it is determined that it is not the last block of the macro block, and processing returns to block 950 to read the next three offsets (see FIG. 9). Thus, blocks 950, 960, and 970 may be repeated three more times until all four blocks of the macro-block are processed. At that point, processing continues to block 975 and since all of the macro blocks in the macro block row have not yet been processed (e.g., only MB0 or MB8 has been processed), processing returns to block 940 where the offset pointer is again set to the temporal pointer, which is still zero.

Next, the reading pointers for Y0 of MB1 or MB9 may be determined similarly to the description of creating or selecting reading pointers for block Y0 of MB0 or MB8. Specifically, at block 950 (see FIG. 9), read offsets 240, 288, and −48 can be read from offsets 822 (see FIG. 8) and added to writing pointer 64 (see block Y0 of MB1 or MB9 of FIG. 6) to create or select reading pointers 304, 352, and 16 (see block Y0 of MB1 or MB9 of FIG. 7). For MB1, pointers 304 and 352 are out of border but pointer 16 points to reference data for block Y1 of MB0. For MB9, the pointers point to reference data for block Y3 of MB4, Y2 of MB5, and Y1 of MB8, respectively (see FIG. 6).

Processing according to process 900 may continue until the writing pointer reaches block Y1 of MB4 or MB12. In this case, at block 950 of FIG. 9, offsets −240, −224, and −16 are read from offset 844 (see FIG. 8) since they are the Y1 block offsets for odd row 614 (see FIGS. 6 and 8). The offsets are added to writing pointer 272 to create or select reading pointers 32, 48, and 256 (see appropriate reading pointers for block Y1 of MB4 or MB12 of FIG. 7). For MB4, the pointers point to reference data locations for blocks Y2 and Y3 of MB0 and Y0 of MB4 (see FIG. 6). For MB12, they point to Y2 and Y3 of MB8 and Y0 of MB12 (see FIG. 6).

Processing according to process 900 continues until the reading pointer is at block Y2 of MB6 or MB14. At this point at block 950, offsets −80, −32, and −48 are read from an offset buffer (such as a buffer of intra-predictor 180 showing offsets 159 of FIG. 1) which are offsets 846 of FIG. 8. The offsets are added to writing pointer 416 to provide reading pointers 336, 384, and 368, which are the proper reading pointers as shown at block Y2 of MB6 or MB14 in FIG. 7. For MB6, the pointers point to reference data location for block Y1 of MB5, Y0 of MB6, and Y3 of MB5, respectively (as shown in FIG. 6). For MB14, they point to Y1 of MB13, Y0 of MB14, and Y3 of MB13, respectively (as shown in FIG. 6).

For example, the concept described above with respect to offsets 159 of FIGS. 1, 8, and 9 may be applied by computing offsets using arithmetic based on the number of macro blocks in a row of a video frame (NUM_MBX), the number of blocks in a macro block for a particular component (e.g., such as four blocks for luminance components Y0 through Y3, and 1 block for components Cr or Cb) (NUM_BLK), the number of reference data (e.g., samples, such as 16 for a first row of 8 samples and a first column of 8 samples of a block) of a block (REF_SZ), and the number of adjacent, abutting, or neighbor blocks that reference data is to be considered for (e.g., such as 3 or optionally 4, as shown in template 360 of FIG. 5).

Using the above factors, the offsets for a system (e.g., a video processing system, such as system 100 of FIG. 1 or intra-predictor 180 of FIG. 2, using a standard such as an MPEG standard) can be determined to consider reference data to the left, left top, and top of a current block or write pointer, where there are four blocks of Y reference data for each macro block according to the following equations.

Compute the total number of Y references in one MB-row (REF_SZ_MBX=4*REF_SZ*NUM_MBX). (0)

To compute left offset:

If left block within the same MB, left offset =−REF_SZ. (1)

If left block in other MB, left offset =−3*REF_SZ. (2)

To compute top offset:

If top block within the same MB, top offset =−2*REF_SZ. (3)

If top block in other MB and current block is:

in even MB-row, top offset =REF_SZ_MBX+ 2*REF_SZ. (4)

In odd MB-row, top offset =−REF_SZ_MBX+ 2*REF_SZ. (5)

To compute left-top offset:

a) If left-top and top blocks within the same MB, left-top offset =top offset−REF_SZ. (6)

b) If left-top and top blocks in different MB's, left-top offset =top offset −3*REF_SZ. (7)

Assume the NUM_MBX is 4 and REF_SZ is 16, then REF_SZ_MBX=256. Then, the following examples illustrate how to get the offsets in FIG. 4 from Eqs (1)-(7):

Use Eq. (1) to get left offset of Y1 or Y3 and get −16.
Use Eq. (2) to get left offset of Y0 or Y2 and get −48
Use Eq. (4) to get top offset of Y0 in even MB-row and get 288.
Use Eq. (5) to get top offset of Y1 in odd MB-row and get −224.
Use Eq. (6) to get left-top offset of Y1 in odd MB-row and get −240.

It is contemplated that using the arithmetic and factors above, the offsets for various other numbers of macro blocks in a row of a video frame, numbers of blocks for a particular component, number of reference data or samples for a block, and number of adjacent blocks to the current block or write pointer considered, can be determined.

For example, the concepts described above with respect to offsets 159 of FIGS. 1 and 8 can be applied to the color samples reference data, such as locations 320 and 330 of FIG. 5. Thus, locations 310 of FIG. 6 may be replaced with locations 320 or 330 of FIG. 5, so that each macro block of FIG. 6 (e.g., MB 0-15) includes one block with a count increasing by 16, instead of 48. Similarly, pointers 750 of FIG. 7 may be replaced with pointers to locations 320 or 330 of FIG. 5, so that each macro block of FIG. 7 (e.g., MB 0-15) includes three pointers (for locations left, left above, and above the write pointer), instead of 12. Specifically, even MB row offsets for Cb or Cr adjacent reference data read pointers would require only three offsets (e.g., such as 48, 64, and −16) while processing along lines 326, 327, and 328 of locations 320. Thus, 48, 64, and −16 would be in place of offsets 822 of FIG. 8. Likewise, odd MB row offsets for Cb or Cr adjacent reference data read pointers would require only three offsets, such as −80, −64, and −16. Thus, −80, −64, and −16 would be in place of offsets 842 of FIG. 8. For Cb or Cr, there offsets 824, 826, 828, 844, 846, and 848 are not required as each 8×8 Cb or Cr block corresponds to a 16×16 Y block (e.g., having four 8×8 Y blocks).

Moreover, the process described above with respect to FIG. 9 may be applied to the Cr and Cb reference data read pointers. Specifically, process 900 may be modified by setting the temporal pointer equal to three in block 930, and removing block 970 from the process.

Additionally, it can be appreciated that the concepts described above with respect to offsets 159 of FIGS. 1 and 8 can be expanded to other adjacent or abutting locations including or not including those identified in template 360 of FIG. 5. In addition as noted, offsets may be considered for optional location ALRA.

It is also considered that reference data locations that are not adjacent or abutted to current location CL, such as locations previously separated from location CL by one or more locations of reference data, may be considered and offsets generated therefore according to the concepts described herein. Thus, the reference data at adjacent or abutting locations to the write pointer or current block being processed may be skipped and locations farther out may be considered.

In addition, the concepts described above with respect to offsets 159 may be applied to frames of data or blocks of data having more or less macro blocks than 4 macro blocks (e.g., such as more or less macro blocks than the rows shown for blocks 130 of FIG. 1). Likewise, the concepts can be applied to reference data formats storing more or less than 16 samples of reference data, such as where reference data is stored for more or less than one column and one row of samples. Specifically, the concept can be applied where one column and one row of reference data is stored and the data at the position column 0, row 0 is stored only once so that only 15 samples are stored. Thus, the offset and the write pointer would be adjusted for increments of 15, such as where the locations shown in FIG. 6 increment by 15 instead of 16.

Also, the concept can be applied where the reference data is more or less than 16 samples because the column and row size is greater than or less than 8 samples, and/or more or less than one column and one row of data is stored as reference data. Similarly, the concept can be applied for various other video processing standards that use color components other than Cb and Cr; in addition to Cb and/or Cr, that use other luminance components than Y components, that use luminance components in addition to or less than Y0, Y1, Y2, and Y3; and that use structures other than macro blocks. For example, the concept may be applied where the luminance samples are also 8×8 blocks corresponding to each 8×8 Cb and Cr component.

In some cases, although the description above for FIGS. 1 and 8 is for 24 luminance (Y) offsets stored in a buffer (e.g., offsets 159), the concepts can be applied to various image and video data to save up to 100 offsets, data entities, bytes, or values in a buffer or memory for luminance or chrominance reference data locations. For instance, the concepts above may be used to store up to 100 offset bytes in a buffer for luminance, and up to half that number for reference data offsets of one or more chrominance types. Moreover, the concept may be applied to more or less macroblocks of data per frames of data than shown above. Similarly, the concept may be expanded to luminance and chrominance reference data for frames of data or blocks of data other than macro blocks.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
   selecting a current writing pointer location from a plurality of reference data locations of a macroblock of a digital video frame, wherein the reference data locations include an even row of locations and an odd row of locations;
   adding the current writing pointer location to a plurality of even row pointer value offsets to select a first plurality of reference data reading pointer even and odd row locations that are adjacent to the current writing pointer location when the current writing pointer location is in the even row;
   adding the current writing pointer location to a plurality of different odd row pointer value offsets to select a different second plurality of reference data reading pointer even and odd row locations that are adjacent to the current writing pointer location when the current writing pointer location is in the odd row;

performing direction intraprediction and intraprediction predicting coding using the first and different second plurality of reference data reading pointer even and odd row locations; and repeating adding by using the even row pointer value offsets to select a third plurality of reference data reading pointer even and odd row locations for each of a plurality of adjacent block even row writing pointer locations from the plurality of reference data locations of the macroblock, and by using the odd row pointer value offsets to select a fourth plurality of reference data reading pointer even and odd row locations for each of a plurality of adjacent block odd row writing pointer locations from the plurality of reference data locations of the macroblock.

2. The method of claim 1, wherein selecting a plurality of reference data locations comprises using the even row pointer value offsets or the odd row pointer value offsets to select at least two locations of one of to a left, to a left and above, and above the current location for each of the plurality of adjacent even row and odd row writing pointer locations.

3. The method of claim 1, further comprising:

storing a plurality of samples from a plurality of macroblocks of the digital video frame in each of a plurality of data buffers corresponding to the first and different second plurality of reference data reading pointer even and odd row locations.

4. The method of claim 3, further comprising performing direction intraprediction and intraprediction predicting coding using the samples stored in buffers corresponding to the first and different second plurality of reference data reading pointer even and odd row locations.

5. The method of claim 4, where performing direction intra prediction and intraprediction predicting coding includes comparing the samples stored in buffers corresponding to the selected a plurality of reference data locations with a plurality of reference data samples corresponding to the current location.

6. The method of claim 3, wherein the even row of locations store samples from a first row of the macro-blocks extending a width of the frame, and the odd row of locations store samples from a second row of the macro-blocks adjacent the first row and extending a width of the frame.

7. The method of claim 1, wherein each of the even row pointer value offsets has a different value than every other even row pointer value offset, and wherein each odd row pointer value offset has a different value than every other odd row pointer value offset.

8. The method of claim 7, wherein each offset points to a pixel in the digital video frame that is immediately adjacent to the writing pointer location.

9. The method of claim 8 wherein the writing pointer location and the reading pointer locations are used for intraprediction processing of frames of digital video data including the digital video frame.

10. The method of claim 1, wherein the plurality of even row pointer value offsets is a set of between two and five offsets that is combined with each writing pointer location when the writing pointer location is in the even row; and wherein the plurality of odd row pointer value offsets is a set of between two and five offsets that is combined with each writing pointer location when the current writing pointer location is in the odd row.

11. The method of claim 10 wherein the sets of even row and odd row pointer value offsets are added to each current writing pointer location to select at least two locations of two a left, to a left and above, or above each current writing pointer location.

12. The method of claim 1, wherein the even row pointer value offsets are a single set of offsets that are added to even row reference data locations of each even row block of the macroblock, and wherein the odd row pointer value offsets are a set of offsets that are added to odd row reference data locations of each odd row block of the macroblocks.

13. The method of claim 12, wherein the even row pointer value offsets are a first subset of offsets to be added to each Y0 writing pointer location of each even row block of the frame, a second subset of offsets to be added to each Y1 writing pointer location of each even row block of the frame, a third subset of offsets to be added to each Y2 writing pointer location of each even row block of the frame, and a fourth subset of offsets to be added to each Y3 writing pointer location of each even row block of the frame; and wherein the odd row pointer value offsets are a first subset of offsets to be added to each Y0 writing pointer location of each odd row block of the frame, a second subset of offsets to be added to each Y1 writing pointer location of each odd row block of the frame, a third subset of offsets to be added to each Y2 writing pointer location of each odd row block of the frame, and a fourth subset of offsets to be added to each Y3 writing pointer location of each odd row block of the frame.

14. A method comprising:

selecting a plurality of reading pointer even and odd row locations to point to a plurality of samples of a digital video frame at locations abutting a current writing pointer location of the video frame, wherein selecting comprises:

arithmetically combining each current writing pointer location with each offset of a plurality of even row pointer location offsets when each current writing pointer location is in an even row of a macroblock of the video frame, and arithmetically combining each current writing pointer location with each offset of a plurality of different odd row pointer location offsets when each current writing pointer location is in an odd row of the macroblock of the video frame, and repeating arithmetically combining using each offset of the even row pointer location offsets to select the plurality of reading pointer even and odd row locations for each of a plurality of adjacent block even row current writing pointer locations of the macroblock of the video frame, and using each offset of the odd row pointer location offsets to select the plurality of reading pointer even and odd row locations for each of a plurality of adjacent block odd row current writing pointer locations of the macroblock of the video frame, further comprising performing direction intraprediction and intraprediction predicting coding using the plurality of reference data reading pointer even and odd row locations.

15. The method of claim 14, wherein the plurality of samples comprise reference data of macro blocks of the video frame.

16. The method of claim 14, wherein the even row pointer location offsets are a single set of offsets that are added to current writing pointer locations of each even row block of the macroblock, and wherein the odd row pointer location offsets are a set of offsets that are added to current writing pointer locations of each odd row block of the macroblocks.

17. The method of claim 16, wherein the even row pointer location offsets are a first subset of offsets to be added to each Y0 current writing pointer location of each even row block of the frame, a second subset of offsets to be added to each Y1 current writing pointer location of each even row block of the frame, a third subset of offsets to be added to each Y2 current writing pointer location of each even row block of the frame, and a fourth subset of offsets to be added to each Y3 current writing pointer location of each even row block of the frame; and wherein the odd row pointer value offsets are a first subset of offsets to be added to each Y0 current writing pointer location of each odd row block of the frame, a second subset of offsets to be added to each Y1 current writing pointer location of each odd row block of the frame, a third subset of offsets to be added to each Y2 current writing pointer location of each odd row block of the frame, and a fourth subset of offsets to be added to each Y3 current writing pointer location of each odd row block of the frame.

18. An apparatus comprising:
a buffer comprising:
a plurality of even macro block (MB) row pointer location offsets used to repeatedly select a first plurality of adjacent reading pointer even and odd row locations of a plurality of reference data locations adjacent to each current block writing pointer location of a macroblock of the plurality of reference data locations by repeatedly adding each current block location to the even MB row offsets when each current location is in an even MB row of the macroblock of the reference data locations, wherein each reference data location stores a plurality of samples of a digital video frame of data;
a plurality of odd MB row pointer location offsets used to repeatedly select a second plurality of adjacent reading pointer even and odd row locations of the plurality of reference data locations adjacent to each current block writing pointer location of the macroblock of the plurality of reference data locations by repeatedly adding each current block location to the odd MB row offsets when each current location is in an odd MB row of the macroblock of the reference data locations, wherein the plurality of even MB row offsets and the plurality of odd MB row offsets each include 4 sub-sets, each sub-set having a plurality of adjacent offsets corresponding to one of the four 8×8 blocks of luminance samples; and
a direction intraprediction coder or an intraprediction predicting coder to use the first and different second plurality of reference data reading pointer even and odd row locations to perform direction intraprediction and intraprediction predicting coding.

19. The apparatus of claim 18, wherein the adjacent locations comprise at least two locations of one of to a left, to a left and above, and above the current location using the even row pointer value offsets or the odd row pointer value offsets, and wherein at least one adjacent location is in the even MB row of locations, and at least one adjacent location is in the odd MB row of locations.

20. The apparatus of claim 18, further comprising:
a plurality of data buffers at the plurality of reference data locations to store the samples, wherein data buffers at the even MB row of reference data locations store samples from a first row of the frame of data extending a width of the frame of data, and data buffers at the odd MB row of reference data locations store samples from a second row of the frame adjacent the first row and extending a width of the frame of data.

21. The apparatus of claim 20, wherein the frame includes a plurality of blocks of samples and each data buffer stores a first row of samples and a first column of samples of a block of samples.

22. The apparatus of claim 21, wherein each block of samples comprises one of:
an 8×8 block of blue chrominance samples (Cb),
an 8×8 block of red chrominance samples (Cr), and
a 16×16 block comprising four 8×8 blocks of luminance samples (Y0, Y1, Y2, and Y3).

23. The apparatus of claim 18, further comprising a write pointer to select the current location from the plurality of reference data locations.

24. The apparatus of claim 18, further comprising a plurality of read pointers to select the plurality of selected adjacent locations using the current location and one of the even MB row offsets and the odd MB row offsets.

25. The apparatus of claim 18, further comprising an intra-predictor to select an adjacent location of the plurality of adjacent locations, and to compare samples of the selected adjacent location with samples of the current location to perform direction intraprediction and intraprediction predicting coding.

26. A system comprising;
a computing device with a video input to receive a frame of digital video, a writing pointer to select a current location of a plurality of samples from a frame of digital video received at the input, and a plurality of reading pointers to repeatedly select a plurality of reference data locations adjacent to each current block location;
a buffer device including:
an even macro block (MB) row of a plurality of reference data locations to store a plurality of samples from a first row of a macroblock of the frame of digital video received at the input extending a width of the frame;
an odd MB row of the reference data locations to store a plurality of samples from a second row of the macroblock of the frame extending a width of the frame, the second row adjacent to the first row;
a plurality of even MB row pointer location offsets used to repeatedly select a first plurality of the reference data even and odd row locations adjacent to each current block location of the macroblock of the reference data locations in the even MB row by repeatedly adding each current block location to the even MB row offsets;
a plurality of odd MB row pointer location offsets used to repeatedly select a second plurality of the reference data even and odd row locations adjacent to each current block location of the reference data locations in the odd MB row by repeatedly adding each current block location of the macroblock to the odd MB row offsets, wherein the plurality of even MB row offsets and the plurality of odd MB row offsets each include 4 sub-sets, each sub-set having a plurality of adjacent offsets corresponding to one of the four 8×8 blocks of luminance samples; and
a direction intraprediction coder or an intraprediction predicting coder to use the first and different second plurality of reference data reading pointer even and odd row locations to perform direction intraprediction and intraprediction predicting coding.

27. The system of claim 26, further comprising:
an adder to add a current location to one of the even MB row offsets and the odd MB row offsets.

28. The system of claim 26, further comprising a plurality of reference data buffers, each of the reference data locations corresponding to each of the reference data buffers, and each reference data buffer to store one of:
a Cb buffer to store a first row of 8 samples and a first column of 8 samples for an 8×8 block of blue chrominance samples (Cb) of a macro-block of samples;

a Cr buffer to store a first row of 8 samples and a first column of 8 samples for an 8×8 block of red chrominance samples (Cr) of a macro-block of samples, and a Y buffer to store a first row of 8 samples and a first column of 8 samples for an 8×8 blocks of luminance samples, wherein the block is one of four 8×8 blocks of a 16×16 block of luminance samples of a macro-block of samples (Y0, Y1, Y2, and Y3).

29. The system of claim 26, wherein the plurality of even MB row offsets comprises 4 sub-sets each to select one adjacent location from the even MB row of the reference data locations, and at least two adjacent location in the odd MB row of the reference data locations, and wherein the plurality of odd MB row offsets comprises 4 sub-sets each to select one adjacent location from the odd MB row of the reference data locations, and at least two adjacent location in the even MB row of the reference data locations.

30. The system of claim 26, further comprising:

an intra-predictor to encode an intraprediction block of code for the frame using the selected plurality of the reference data locations adjacent to the current location.

* * * * *